US008031903B2

(12) United States Patent
Paresi et al.

(10) Patent No.: US 8,031,903 B2
(45) Date of Patent: Oct. 4, 2011

(54) NETWORKED SECURITY SYSTEM

(75) Inventors: Joseph S. Paresi, New York, NY (US); Andrea L. Whitson, Waltham, MA (US)

(73) Assignee: L-3 Communications Security and Detection Systems, Inc., Woburn, MA (US)

( * ) Notice: Subject to any disclaimer, the term of this patent is extended or adjusted under 35 U.S.C. 154(b) by 1235 days.

(21) Appl. No.: 11/544,301

(22) Filed: Oct. 6, 2006

(65) Prior Publication Data

US 2007/0280502 A1     Dec. 6, 2007

Related U.S. Application Data

(63) Continuation of application No. 11/347,737, filed on Feb. 2, 2006, now abandoned, which is a continuation-in-part of application No. 10/993,929, filed on Nov. 19, 2004, which is a continuation-in-part of application No. 10/262,550, filed on Oct. 1, 2002, now abandoned, and a continuation-in-part of application No. 10/116,693, filed on Apr. 3, 2002, now Pat. No. 7,139,406, and a continuation-in-part of application No. 10/116,714, filed on Apr. 3, 2002, now Pat. No. 6,707,879, and a continuation-in-part of application No. 10/116,718, filed on Apr. 3, 2002, now Pat. No. 6,721,391.

(60) Provisional application No. 60/326,406, filed on Oct. 1, 2001, provisional application No. 60/523,375, filed on Nov. 19, 2003, provisional application No. 60/649,303, filed on Feb. 2, 2005, provisional application No. 60/725,915, filed on Oct. 11, 2005.

(51) Int. Cl.
*G06K 9/00*    (2006.01)
*G08B 13/14*   (2006.01)
*G07B 15/00*   (2011.01)
*G09Q 40/00*   (2006.01)

(52) U.S. Cl. .................. 382/100; 340/572.1; 340/572.4; 705/4; 705/13

(58) Field of Classification Search .................. 382/100; 340/572.4, 572.1; 378/57; 705/4, 13
See application file for complete search history.

(56) References Cited

U.S. PATENT DOCUMENTS 4,020,346 A    4/1977    Dennis
(Continued)

FOREIGN PATENT DOCUMENTS

WO    WO 02/082290 A1    10/2002

OTHER PUBLICATIONS

I. D. Jupp et al, "The Non-Invasive Inspection of Baggage Using Coherent X-ray Scattering," IEEE Transactions on Nuclear Science, vol. 47, No. 6, Dec. 2000, pp. 1987-1994.
Michael J. Barrientos, "Screener Threat Detection Performance With Three Dimensional X-ray Imaging," International Carnahan Conference on Security Technology, 2000, Proc. IEEE 34th Annual 2000, pp. 178-191.

(Continued)

*Primary Examiner* — Vu Le
*Assistant Examiner* — Amara Abdi
(74) *Attorney, Agent, or Firm* — Wolf, Greenfield & Sacks, P.C.

(57) ABSTRACT

The application discloses a system and methods for remote access and analysis of data collected about items under inspection. The system includes one or more data collection stations, each of which may include an X-ray scanner that scans the items under inspection to obtain data about the items. The data is transmitted to one or more remote stations, where the data is remotely analyzed to determine whether the item contains a potential threat, such as, for example, explosives or other contraband. Data may be aggregated so that correlations between data collected for different items may be used to more accurately detect threats.

14 Claims, 10 Drawing Sheets

U.S. PATENT DOCUMENTS

| | | | |
|---|---|---|---|
| 4,064,440 | A | 12/1977 | Roder |
| 4,217,641 | A | 8/1980 | Naparstek |
| 4,247,774 | A | 1/1981 | Brooks |
| 4,539,648 | A * | 9/1985 | Schatzki ............... 250/358.1 |
| 4,580,219 | A | 4/1986 | Pele et al. |
| 4,590,558 | A | 5/1986 | Glover et al. |
| 4,709,333 | A | 11/1987 | Crawford |
| 4,759,047 | A | 7/1988 | Donges et al. |
| 4,788,704 | A | 11/1988 | Donges et al. |
| 4,941,162 | A | 7/1990 | Vartsky et al. |
| 4,957,250 | A | 9/1990 | Hararat-Tehrani |
| 5,070,519 | A | 12/1991 | Stein et al. |
| 5,109,691 | A | 5/1992 | Corrigan et al. |
| 5,125,015 | A | 6/1992 | Shimoni et al. |
| 5,162,652 | A | 11/1992 | Cohen et al. |
| 5,182,764 | A | 1/1993 | Peschmann et al. |
| 5,243,664 | A | 9/1993 | Tuy |
| 5,299,116 | A * | 3/1994 | Owens et al. ............... 705/28 |
| 5,319,547 | A | 6/1994 | Krug et al. |
| 5,323,004 | A | 6/1994 | Ettinger et al. |
| 5,367,552 | A | 11/1994 | Peschmann |
| 5,490,218 | A | 2/1996 | Krug et al. |
| 5,600,303 | A * | 2/1997 | Husseiny et al. ......... 340/568.1 |
| 5,600,700 | A | 2/1997 | Krug et al. |
| 5,642,393 | A | 6/1997 | Krug et al. |
| 5,805,660 | A | 9/1998 | Perion et al. |
| 5,838,758 | A | 11/1998 | Krug et al. |
| 5,909,478 | A | 6/1999 | Polichar et al. |
| 5,933,471 | A | 8/1999 | Kalvin |
| 5,974,111 | A | 10/1999 | Krug et al. |
| 6,014,451 | A | 1/2000 | Berry et al. |
| 6,014,628 | A | 1/2000 | Kovarik, Jr. |
| 6,018,562 | A | 1/2000 | Willson |
| 6,076,400 | A | 6/2000 | Bechwati et al. |
| 6,088,423 | A | 7/2000 | Krug et al. |
| 6,094,472 | A | 7/2000 | Smith |
| 6,118,850 | A | 9/2000 | Mayo et al. |
| 6,163,591 | A | 12/2000 | Benjamin |
| 6,198,795 | B1 | 3/2001 | Naumann et al. |
| 6,218,943 | B1 * | 4/2001 | Ellenbogen ............... 340/572.4 |
| 6,272,230 | B1 | 8/2001 | Hiraoglu et al. |
| 6,345,113 | B1 | 2/2002 | Crawford et al. |
| 6,370,222 | B1 | 4/2002 | Cornick, Jr. |
| 6,707,879 | B2 | 3/2004 | McClelland et al. |
| 6,721,391 | B2 | 4/2004 | McClelland et al. |
| 6,754,196 | B1 | 6/2004 | Daane et al. |
| 6,829,585 | B1 | 12/2004 | Grewal et al. |
| 7,139,406 | B2 | 11/2006 | McClelland et al. |
| 2002/0172324 | A1* | 11/2002 | Ellengogen ............... 378/57 |
| 2003/0085163 | A1 | 5/2003 | Chan et al. |
| 2003/0225612 | A1* | 12/2003 | DeSimone et al. ............ 705/13 |
| 2004/0101098 | A1 | 5/2004 | Bijjani et al. |
| 2005/0008119 | A1 | 1/2005 | McClelland et al. |
| 2005/0031076 | A1 | 2/2005 | McClelland et al. |
| 2005/0198226 | A1 | 9/2005 | DeLia et al. |
| 2007/0043598 | A1* | 2/2007 | Bertram et al. ................ 705/5 |
| 2009/0231134 | A1* | 9/2009 | Modica et al. ............ 340/568.1 |

OTHER PUBLICATIONS

S.P. Beevor et al., "Non-Invasive Inspection of Baggage Using Coherent X-ray Scattering," European Convention on Security and Detection, 1995.

Roder, Fredrick L., "Explosives Detection by Dual-Energy Computed Tomography," Proc. SPIE, Apr. 19-20, 1979, pp. 171-178.

Office of Technology Assessment, Congressional Board of the 102d Congress, publicly released Feb. 26, 1991, entitled "Technology Against Terrorism, The Federal Effort".

"Multi-ViewTomography, Model MVT" Brochure, Vivid Technologies, Inc., MVT0699, Rev. 1 (Release date Oct. 1997).

"Vivid VIS108" Brochure, L-3 Communications Security and Detection Systems, Rev. Sep. 2002.

Vivid, "Glossary of Terms," from www.vividusa.com, archived on Jun. 13, 1998 by www.archive.org, pp. 1-2.

Hodgson, K., "100 Percent Screening," *Security Magazine* 36(2):11-12 (1999).

International Search Report Received in Application No. PCT/US2004/038885, mailed Jan. 31, 2006.

Vivid Technologies Incorporated, "Company Background," date unknown, cited by Examiner in Office Action dated Dec. 6, 2005 in connection with U.S. Appl. No. 10/262,550.

Vivid Technologies Incorporated, News Release entitled "Vivid Technologies Announces First-Ever Orders from Italy and China," (Aug. 12, 1998), pp. 1-2.

Vivid Technologies Incorporated, News Release entitled "Vivid Technologies Unveils Threat Image Projection System," (Dec. 1, 1998), one page.

Vivid Technologies Incorporated, News Release entitled "Japanese Customs Agency Selects Vivid Technologies Detection Systems for Drug Interdiction," (Nov. 4, 1998), one page.

Vivid Technologies Incorporated, News Release entitled "Athens and Birmingham Airports Select Vivid Technologies Explosives Detection Systems," (Mar. 4, 1999) pp. 1-2.

Vivid Technologies Incorporated, News Release entitled "Saudi Arabian Airport Orders Seven Vivid Technologies Explosives Detection Systems," (Jul. 20, 1998), one page.

Vivid Technologies Incorporated, News Release entitled "Vivid Technologies Announces Hand Baggage Screening System Orders for Facility Protection," (Jul. 6, 1998), one page.

Vivid, Model YDS, "Level 3 Inspection," Jul. 1998, pp. 1-2.

Vivid, Model APS, "Advanced Passenger Screening," Jul. 1998, pp. 1-2.

Vivid, Model APS, "Advanced Package Screening," Jul. 1998, pp. 1-2.

Vivid, Model VIS "Integrated Level 1 Inspection," Jul. 1998, pp. 1-4.

* cited by examiner

NETWORKED SECURITY SYSTEM

CROSS-REFERENCE TO RELATED APPLICATIONS

This application is a continuation of, and claims priority under 35 U.S.C. §120 to, U.S. patent application Ser. No. 11/347,737, filed Feb. 2, 2006, which is a continuation-in-part of, and claims priority under 35 U.S.C. §120 to U.S. patent application Ser. No. 10/262,550, filed Oct. 1, 2002, which claims priority under 35 U.S.C. §119(e) to U.S. Provisional Application Ser. No. 60/326,406 entitled "Remote Data Access," filed on Oct. 1, 2001, and which is a continuation in part of, and claims priority under 35 U.S.C. §120 to, commonly-owned U.S. patent application Ser. No. 10/116,693, entitled "A Remote Baggage Screening System, Software and Method," filed Apr. 3, 2002, Ser. No. 10/116,714, entitled "A Remote Baggage Screening System, Software and Method," filed Apr. 3, 2002, and Ser. No. 10/116,718, entitled "A Remote Baggage Screening System, Software and Method," filed Apr. 3, 2002. This application also is a continuation in part of, and claims priority under 35 U.S.C. §120 to, commonly-owned U.S. patent application Ser. No. 10/993,929 filed Nov. 19, 2004, entitled "SECURITY SYSTEM WITH DISTRIBUTED COMPUTING," which claims priority under 35 U.S.C. §119(e) to U.S. Provisional Application Ser. No. 60/523,375, filed Nov. 19, 2003, entitled "SECURITY SYSTEM WITH DISTRIBUTED COMPUTING." This application also claims priority under 35 U.S.C. §119(e) to U.S. Provisional Application Ser. No. 60/649,303, filed Feb. 2, 2005, entitled "NETWORKED EXPLOSIVES DETECTION SYSTEMS," and to U.S. Provisional Application Ser. No. 60/725,915, filed Oct. 11, 2005, entitled "NETWORKED EXPLOSIVES DETECTION SYSTEMS." All of the foregoing of which are herein incorporated by reference in their entirety.

BACKGROUND

1. Field of the Invention

The present invention relates to a system and method for remotely transmitting X-ray data over a communication channel to enable remote access to, and analysis of, that data. One application for the invention is in the field of baggage screening.

2. Discussion of Related Art

A number of conventional systems for screening both checked and carry-on baggage at airports are in use, including X-ray scanners, computed tomography (CT) scanners, and the like. Some of the systems are largely automated and include computing equipment that implements threat detection software. Some of these and other such systems are multilevel screening systems which may involve human operation in at least some levels of the screening process. An operator views a reconstructed image of an item under inspection on a monitor or view-screen, and makes decisions regarding, for example, whether the item may present a threat, and/or should be subjected to more detailed screening.

Presently existing systems provide differing degrees of sophistication in terms of their ability to analyze and screen objects based on X-ray data obtained about the object. Though, screening of carry-on baggage has traditionally been done with smaller and less automated equipment than checked baggage. Some, systems for example, balance the speed of baggage screening with the degree of certainty in screening for explosives, contraband and the like. In addition, especially in the United States, operators of such systems have varying levels of skill. Often, operators of first-level screening equipment for checked or carry-on baggage at airports have a lower level of skill than those who may be located remote from such equipment.

There exists a need for improved systems and methods for baggage screening for explosives, contraband and the like at airports and in other locations.

SUMMARY OF THE INVENTION

In one aspect, the invention relates to a method of operating a networked security system. According to the method, data is acquired on each of a plurality of items under inspection. The acquired data is transmitted over a network to a viewing location. At the viewing location, a series of images is displayed for an operator. The series of images includes a training image inserted into other images of items under inspection.

In another aspect, the invention relates to a networked security system. The system includes a security check-point. The check-point has an inspection area an input device adapted to read passenger identifying information. A server can access information on a set of passengers. A network connects the input device to the server. The network is adapted to communicate the passenger identifying information from the input device to the server and to communicate from the server to the security check-point an indication of whether a passenger is in the set of passengers.

In another aspect, the invention relates to a networked security system. The system has a plurality of security check-points. Each security check-point comprises a data collection station adapted to collect data on each of a plurality of items of luggage and an input device adapted to read identifying information relating to each of the plurality of items of luggage. A network interconnects the plurality of security check-points and a sever. The network is adapted to communicate the data from the data collection station and the input device of each of the plurality of security check-points to the server. Computer-readable medium associated with the server holds data on each of the plurality of items of luggage and identifying information relating to each of the plurality of items of luggage. The server is also programmed to identify a group of items of luggage based on the identifying information and analyze the data on each of the items of luggage in the group to detect a threat object in any of the items of luggage in the group based in part on data from another of the items of luggage in the group.

BRIEF DESCRIPTION OF THE DRAWINGS

The foregoing and other features, objectives and advantages of the present invention will be apparent from the following description with reference to the accompanying figures, which are provided for purposes of illustration only and are not intended as a definition of the limits of the invention. In the figures, in which like reference numerals indicate like elements throughout the different figures.

DETAILED DESCRIPTION

Figure 1:
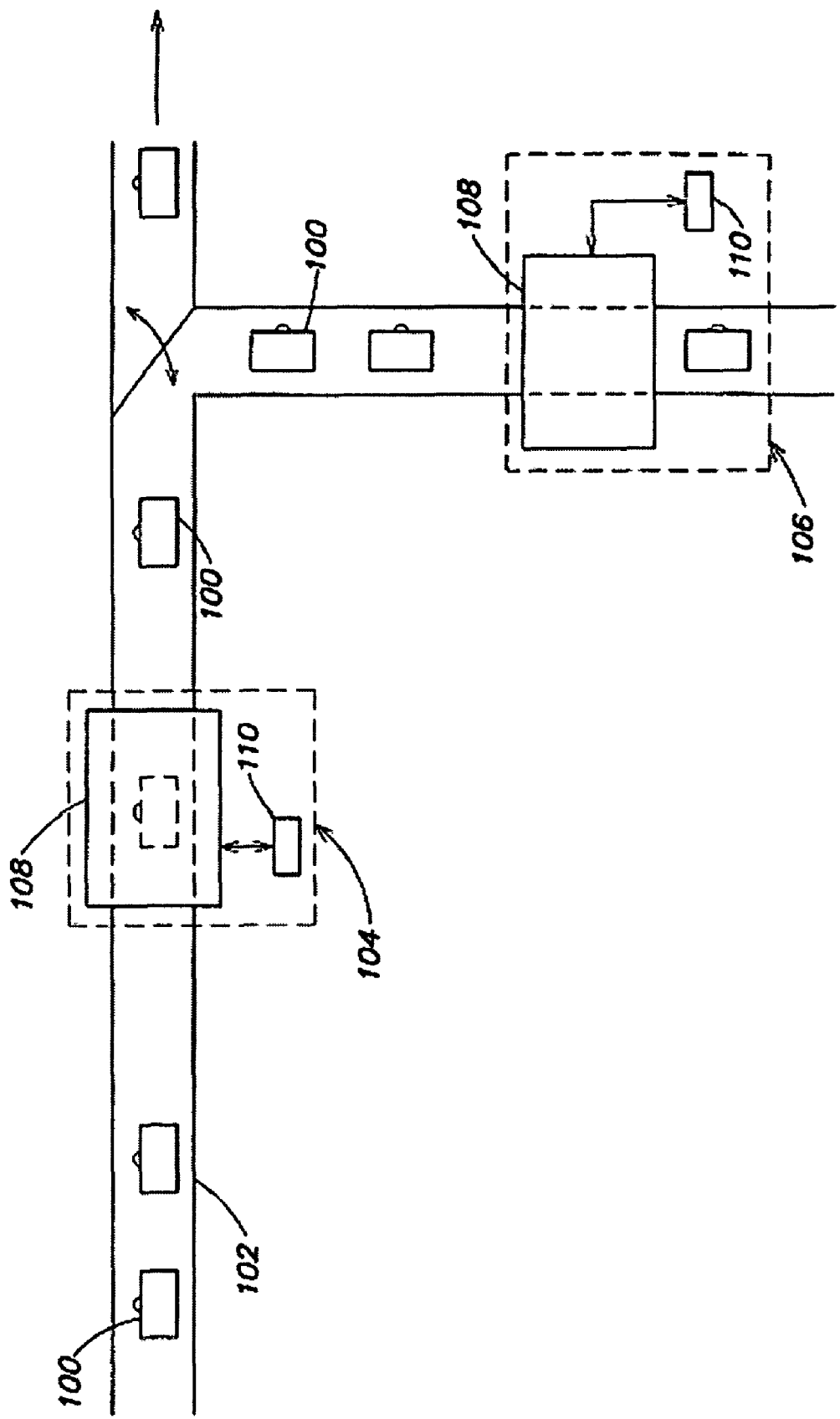
FIG. 1 is a schematic block diagram of an example of a multilevel screening system.

The present invention provides a system and methods for remote analysis of data collected at another location. Screening decisions may be made regarding the objects based on the remote analysis.

Remote analysis allows data to be aggregated, such that screening decisions may be based on data collected on multiple pieces of baggage, whether that baggage belongs to the same passenger, different passengers on the same flight or different passengers traveling contemporaneously. In addition, remote analysis facilitates fusion of information with information obtained by inspecting baggage. Such information may include information about the national threat level, or about the identify of an individual passenger.

It is to be understood that the invention is not limited in its application to the details of construction and the arrangement of components set forth in the following description or illustrated in the drawings. Other embodiments and manners of carrying out the invention are possible. Also, it is to be understood that the phraseology and terminology used herein is for the purpose of description and should not be regarded as limiting. The use of "including," "comprising," or "having" and variations thereof is meant to encompass the items listed thereafter and equivalents thereof as well as additional items. In addition, it is to be appreciated that the term "communication channel" as used herein refers to any now known or later developed channel for transmission of data, such as, but not limited to a telephone line, the Internet, a wireless channel, a local or wide area network link, an intranet, a dedicated link, and the like.

Referring to FIG. 1, there is illustrated one embodiment of a multilevel screening system, located for example, at an airport. It is to be appreciated that although the following discussion will refer primarily to baggage inspection systems located at airports, and to screening of baggage, the invention is not so limited, and may be equally applied to baggage screening at, for example, bus depots or train terminals, or to screening of packages at, for example, post offices or other mail centers. In the illustrated example, items of baggage 100 may be transported along a conveyor 102 and may be examined by one or more baggage inspection stations 104, 106. In this example, the system includes two levels of screening: a level one inspection station 104, and a level two inspection station 106. Items of baggage 100 that are not cleared by the level one station 104 may be transported to the level two inspection station 106 for further examination. It is to be appreciated that the system is not limited to two levels of screening, as shown, but may include only one level of screening or more than two levels of screening, as desired.

According to one embodiment, an inspection station, such as the level one or level two inspection stations 104, 106 illustrated in FIG. 1, may include an inspection machine 108 and an operator station 110, coupled to the inspection machine 108, that may be used to scan and screen an item under inspection. The item under inspection may be, for example, an item of baggage 100, or may be located within an item of baggage 100. The inspection machine may include, for example, a single-energy X-ray scanner, a dual-energy X-ray scanner, a CT scanner, a magnetic resonance imaging (MRI) scanner, a nuclear quadrapole resonance (NQR) scanner, any nuclear-based imaging scanner or gamma scanning system, or a combination of such scanners. It is to be understood that although the following discussion will refer, in particular, to X-ray data obtained about the item under inspection, any of the above-mentioned scanners may be used to scan the item and corresponding data may be obtained and analyzed according to the methods of the invention.

Also, it is to be understood that it is not necessary that the same inspection technology be used at all levels of screening. For example, an x-ray inspection system may be used for level one screening, but a manual search may be used for level two screening.

Figure 2:
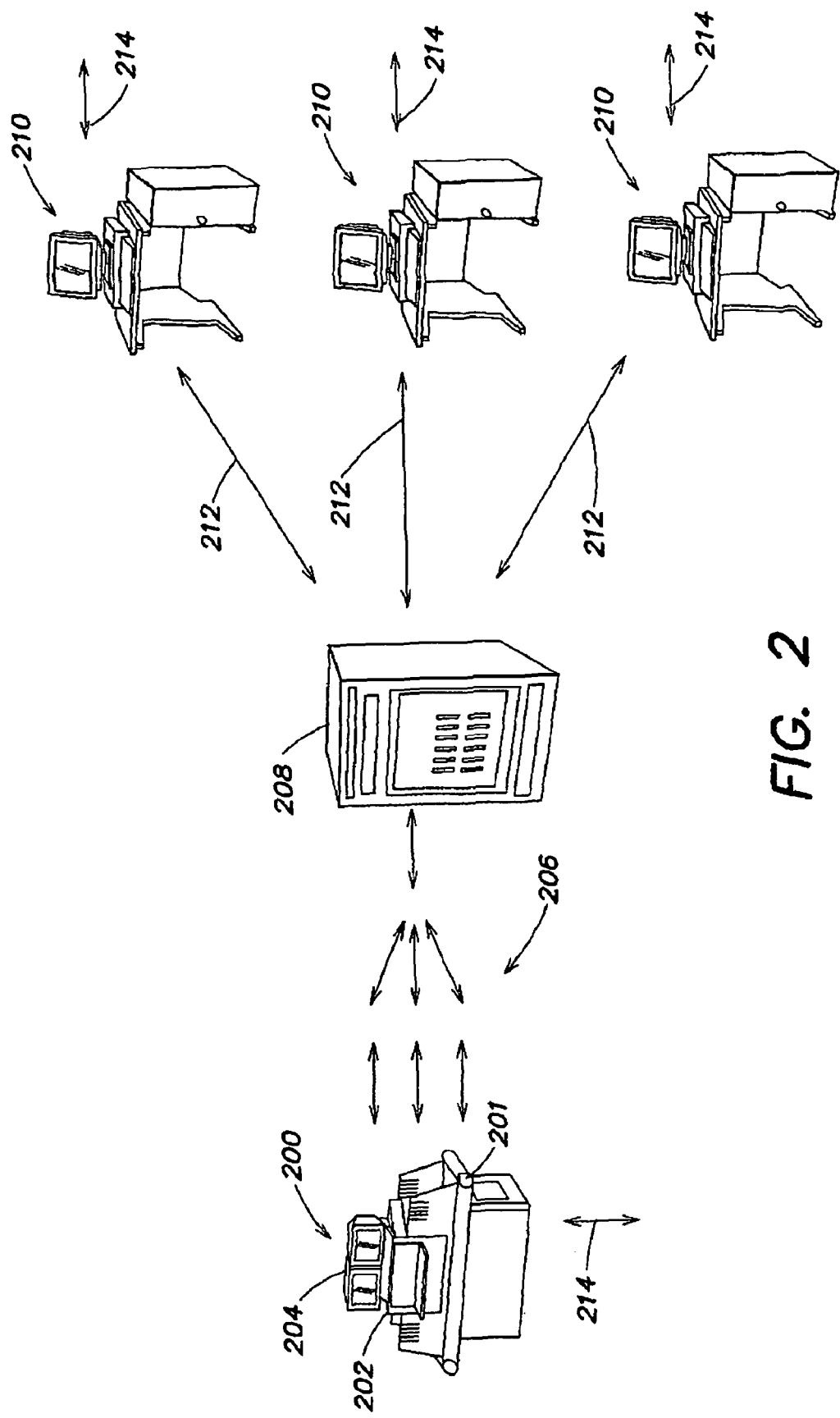
FIG. 2 is a schematic block diagram of one example of a remote data access system according to aspects of the invention.

Referring to FIG. 2, a data collection station 200 may include an X-ray scanner 202, that may scan an item under inspection and obtain X-ray data about the item. The item may be placed on a conveyor belt 201 that may transport the item through the X-ray scanner. The data collection station may be, for example, either of the level one or level two inspection stations illustrated in FIG. 1. In one embodiment, the X-ray data may be passed to an operator interface 204 coupled to the X-ray scanner, which may display an X-ray image of the item under inspection reconstructed from the X-ray data. An operator may examine the X-ray image and make a screening decision regarding the item under inspection. In some cases, the operator may decide that the item warrants further or more detailed inspection, and the item and X-ray data obtained about the item may be passed to, for example, a level two or level three inspection station. In conventional systems, the inspection stations, such as inspection stations 104, 106 (see FIG. 1) are connected in a closed, local area network. Data obtained by the level one inspection station 104 about an item of baggage 100 is sent only to the level two inspection station 106, and may be passed from the level two inspection station 106 to a level three inspection station if the system includes one. By contrast, according to some examples of the present invention, the X-ray data obtained about the item under inspection at the data collection station 200 may be transferred not only to a higher level inspection station, but to any number of remote locations, as is discussed in more detail below.

According to one embodiment, the X-ray data obtained about the item under inspection may be transferred across a communication channel 206 from the data collection station 200 to a remote server 208 which may in turn transfer the X-ray data to any one or more remote expert stations 210. As discussed above, the communication channel 206 may comprise any of a telephone line, the Internet, a wireless channel, a local or wide area network link, an intranet, a dedicated link, etc. that may be used to transfer data to a remote location. It is to be understood that the term "remote" as used herein refers to a location that is not the same location as the local item. For example, if a data collection station is located at a first terminal of an airport, a "remote" expert may be an expert located in a different city, at a location in the same city that is not the airport where the data collection station is located, at another terminal of the airport, or in another part of the same terminal, etc. It is also to be appreciated that the system need not include a server 208 and that the data collection station 200 may transfer the X-ray data directly to a remote expert station 210, as is discussed in more detail below.

It is further to be understood that each of the data collection station 200 and remote expert stations 210 may include computing equipment and operator interfaces that may operate according to known principles. Thus, an operator at any stations may "log on" to the system and access data and software using conventional computing operator interfaces known to those of skill in the art.

Figure 3:
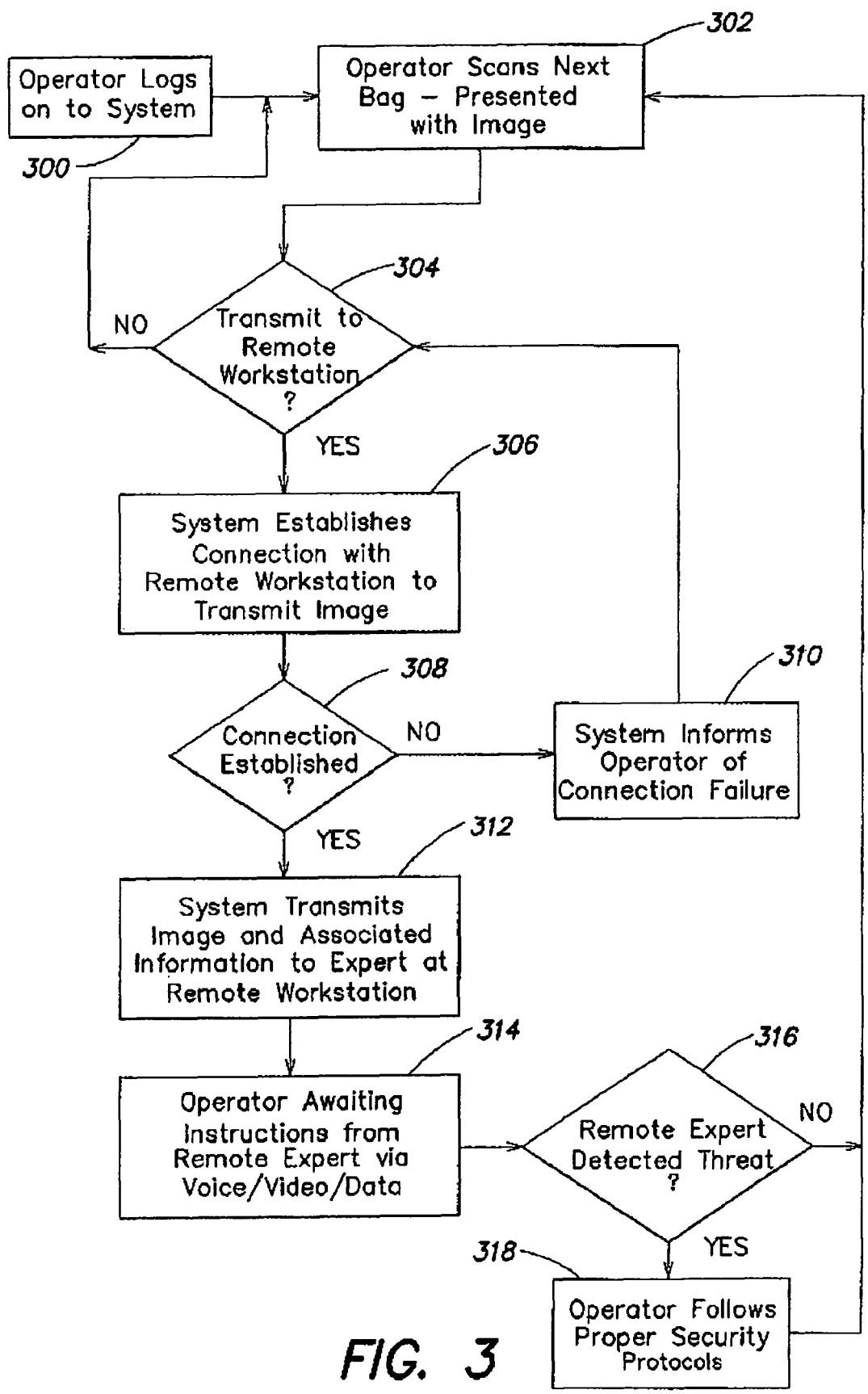
FIG. 3 is a flow diagram illustrating aspects of one example of a method of remote data access, according to one embodiment of the invention.

Referring to FIG. 3, there is illustrated a flow diagram of one example of a method of remote data access according to the present invention. In a first step 300, an operator may log on to a data collection station. This may occur at the beginning of an operator's shift, or when the data collection station begins operation on a particular day or at a particular time. It is to be appreciated that where the data collection station is automated and does not require the presence of a human operator, step 300 may represent the turning on of the X-ray scanner and/or associated computing system.

In a next step 302, the X-ray scanner at the data collection station may scan the item under inspection and collect X-ray data about the item under inspection. In one example, the X-ray scanner may scan the entire item, for example, an entire item of baggage. In another example, the X-ray scanner may scan a portion of the item, such as, for example, a previously identified suspect region within the item under inspection. The X-ray scanner may transfer the X-ray data to an operator interface where the operator may view an X-ray image of the item under inspection. The operator interface may be local to the x-ray scanner or may be remote. In one embodiment, the operator interface may include computer equipment that may be adapted to run threat detection software. In this embodiment, the displayed X-ray image may include indications of potential threats that may have been detected by the software. For example, the image may include a threat polygon, or a highlighted region that may correspond to a potential threat located within the item under inspection.

If the operator determines that the item under inspection may potentially contain a threat, such as, for example, an explosive material or other contraband item, or that the item under inspection warrants more detailed analysis, the operator may decide to transmit the X-ray data to a remote expert station, as indicated by step 304. If, on the other hand, the operator decides that the item under inspection does not need to be examined by an expert, the item may be passed along to either a higher level inspection station or to a loading area, and the operator may allow a next item to be scanned by the X-ray scanner. It is to be appreciated that although this, and the following, discussion refers to a human operator viewing the X-ray image and making a decision regarding whether or not to transmit the X-ray data to the remote expert station, the invention is not so limited. The data collection station may not be operated by a human operator, and instead may include a computer processor and threat detection software that may automatically analyze the X-ray data obtained by the X-ray scanner and automatically decide whether or not to transfer the X-ray data to the remote expert station based upon, for example, particular threat detection algorithms.

When the operator (or software algorithm) determines that the item under inspection should be examined by a remote expert, the operator may transmit the X-ray data to the remote expert station via a communication channel, as illustrated in FIG. 2, and indicated by steps 306-312. In a first step 306, the operator may establish a link between the data collection station 200 and the remote expert station 210. In one example, this step may involve initiating a dial-up connection, for example, where the communication channel may be a telephone line or Internet connection. In another example, where the communication channel may include a dedicated link, this step may involve selecting a "send" option presented in the user interface software. If for some reason a connection between the data collection station and the remote expert station (or server) can not be established, the user interface software may inform the operator of connection failure (step 310) by, for example, displaying a connection error message or symbol, and the operator may take appropriate action. If the connection is successfully established (step 308), the X-ray data may be transferred to the remote expert station, as indicated in step 312.

It is to be appreciated that the X-ray data may be transmitted in step 312 using any conventional data transfer software and/or protocol. The X-ray data may be transmitted in digital or analog form, in mixed signal form, as compressed data (which may have been compressed using any compression algorithm or technique known to those skilled in the art), or in another form. The X-ray data transmitted may be raw X-ray data, or may be processed data, having been processed by software running on the data collection station operator interface.

In addition, the transmitted data may include identification data in addition to the X-ray data so as to link or identify the X-ray data with a particular item under inspection. For example, the identification data may include data such as, but not limited to, data associated with a digital photograph of a passenger or person to whom the item under inspection belongs, flight information (such as flight number, airline, point of origin or destination), a passport number, a bar code of a ticket of the passenger, data indicating that the owner of the item of baggage is a participant of a trusted traveler program or other data regarding the item or the person to whom the item belongs. Data linked to an image may also identify the environment in which the image was acquired, including the time or place in which the image was acquired. This identification data may be used by the remote expert during analysis of the X-ray data, or may be used to aggregate information as is discussed in more detail below.

In some applications, it may be important to transmit the data over a secure communication channel, in which case, the data may be encrypted using an encryption algorithm as known to those skilled in the art, and/or may be transmitted using a secure transfer protocol, such as, for example, secure socket layer (SSL) protocol or secure hypertext transfer protocol (HTTPS) or another secure transfer protocol known to those of skill in the art. In another embodiment, the operator at the data collection station may email the X-ray and identification data to the remote expert station.

In contrast to systems in which a remote operator may request data from a data collection station (i.e., "pull" data), the system and methods disclosed herein allow for an operator at the data collection station to "push" the data to a remote expert station, i.e., the operator initiates transfer of the data when deemed necessary or desirable. As illustrated in FIG. 2, the system may include a plurality of remote expert stations, each of which may be co-located or disposed at different locations. In one embodiment, the operator at the data collection station 200 may select to which remote expert station to transmit the X-ray data based on, for example, the type of threat suspected to be present within the item under inspection. For example, one remote expert may be particularly qualified to analyze X-ray data from an item under inspection that potentially contains an explosive, whereas another remote expert may be particularly qualified to examine data from an item that may contain agricultural contraband. If either the operator or computing equipment present at the data collection station is capable of making an initial determination about the type of threat potentially present in a suspect item, then the remote expert may be selected on this basis. In another embodiment, the system may include a server 208, as illustrated. All X-ray data may be transmitted from the data collection station 200 to the server 208, which may pass the X-ray data on to a selected remote expert station 210 based on criteria such as, for example, availability of the remote experts, the amount of data traffic present on any given link 212 to a particular remote expert station, etc. Once the data has been transmitted to the remote expert station, the operator may wait for instructions from the remote expert regarding handling of the item under inspection, as illustrated by step 314. During this waiting period, the suspect item under inspection may be removed from the conveyor and stored so that other items may be scanned in the meantime.

Figure 4:
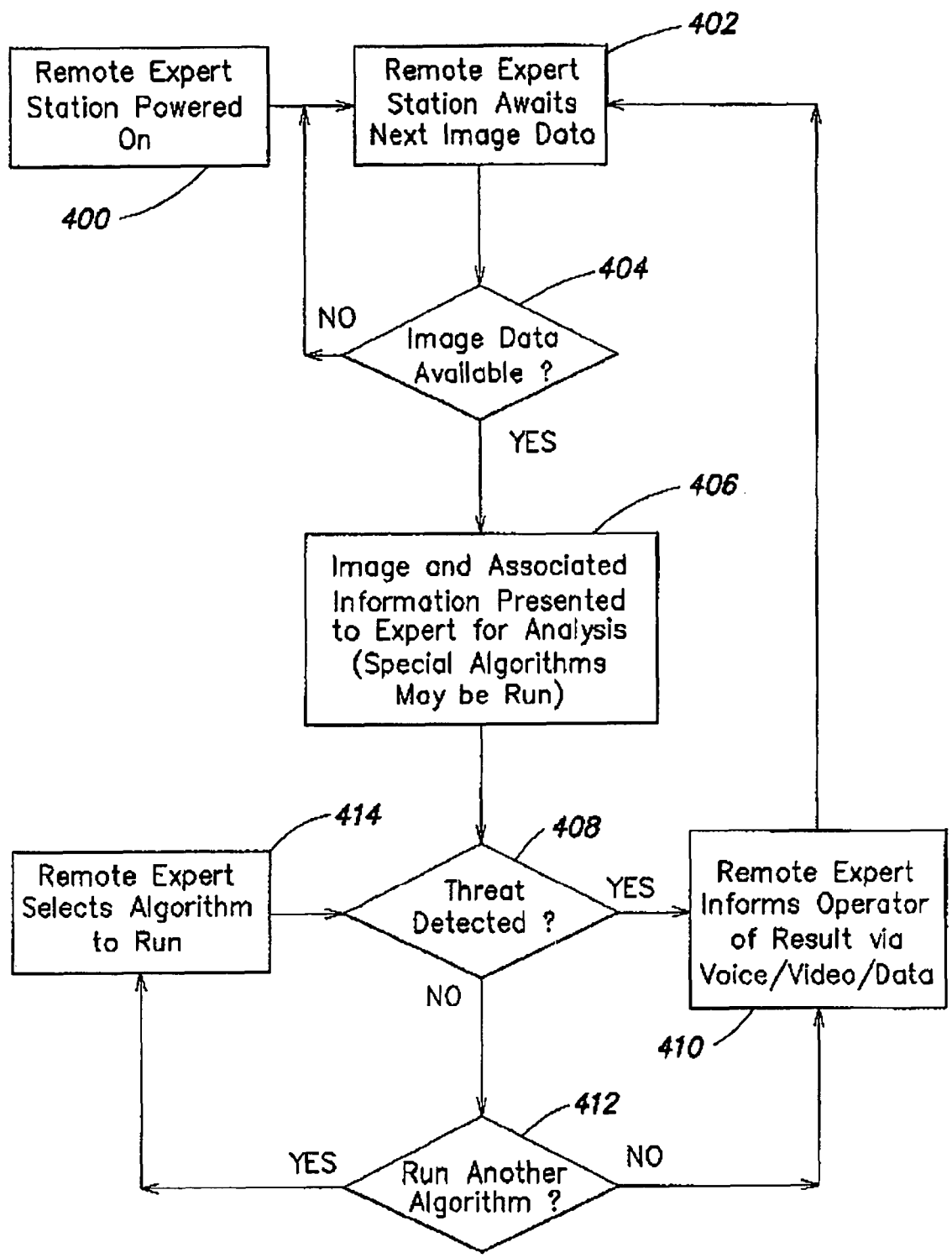
FIG. 4 is a flow diagram illustrating aspects of an example of remote data access, according to an embodiment of the invention.

Referring to FIG. 4, there is illustrated a flow diagram of one example of a method of remote data analysis occurring at the remote expert station. In a first step 400, an operator may log on to a remote expert station, and/or computing equipment located at the remote expert station may be powered on. This step may represent the beginning of an operator's shift at the remote expert station, or the beginning of the day, etc. In next steps 402 and 404, the remote expert station waits for an operator at the data collection station to initiate a data transfer and send the X-ray data and associated identification data. It is to be appreciated that once the operator at the data collection station initiates transfer of the data to the remote expert station, the remote expert may access the transmitted data through any protocol known to those of skill in art, such as, but not limited to, email, an Internet web page, an intranet, and the like. In some examples, the remote expert may be required to enter a password to access any new data, or to access encrypted data. In another example, a password may only be required at the log on step 400.

In one embodiment where the system includes a server, the server may store X-ray and identification data collected about items under inspection at the data collection station. When a remote expert station becomes operational (step 400), the remote expert may access the server and retrieve stored data for analysis.

It is to be appreciated that the term "remote expert" as used herein may refer to a trained human operator, who may have a higher level of skill or more expertise than an operator at the data collection station. In embodiments in which data collection stations do not have human operators, the "remote expert" may be any human operator that views the data. The term may also refer to a computing system that may include sophisticated threat detection software adapted to analyze the X-ray data and produce, for example, a clearing decision (i.e., threat or no threat detected) or a threat polygon, etc., that may then be transmitted back to the data collection station. Thus, in some embodiments, the remote expert may be a human operator that may work in conjunction with threat detection software running on the computing equipment at the remote expert station, and in other embodiments a human operator may not be present at the remote expert station.

In step 406, the remote expert may analyze received X-ray data for potential threat items, such as, for example, explosives or other contraband. As discussed above, the transmitted data may include raw X-ray data, in which case computing equipment at the remote expert station may perform data processing to provide an X-ray image of the item under inspection for analysis by the remote expert. The computing equipment may further include advanced image and/or data processing software with which the remote expert may manipulate the X-ray data and/or image in order to determine whether or not a threat is present in the item under inspection. According to one embodiment, the remote expert may run tailored threat detection algorithms on the X-ray data, depending on information contained in the identification data. For example, the threat detection algorithm may be chosen based on a point of origin of the passenger associated with the item under inspection. Or, the threat detection algorithms may be selected based on time of year, a national threat level or other environmental factors. In embodiments in which remote expert stations are connected to a command server 208, threat detection algorithms may be easily altered by reprogramming server 208. Alternatively, the remote expert may run a variety of threat detection algorithms on the X-ray data, as shown by steps 408, 412 and 414, using multiple algorithms to attempt to locate or identify a suspicious region or material in the item under inspection (represented by the X-ray data).

As shown by steps 408-414, once the remote expert has completed analysis of the X-ray data, a screening result may be transmitted to the data collection station so that a decision on the disposition of the item of baggage under inspection may be made. The item, for example, may be cleared, rejected or diverted for further inspection. In some embodiments, the remote expert may inform an operator at the data collection station of the result. The data (X-ray and identification) may be re-transmitted back to the data collection station, along with the remote expert's screening results. According to one embodiment, the remote expert may initiate a voice and/or video link with an operator at the data collection station. This may be done with any standard protocol known to those of skill in the art, using, for example, a conventional telephone link (wireless or land-line), or voice or video conferencing through the computing equipment. In one embodiment, the remote expert may engage in dialog with the operator at the data collection station, and may, for example, request that the item under inspection be re-scanned, or scanned from a different angle, etc., to assist the remote expert in analyzing the item. The remote expert may further provide the operator at the data collection station with instructions regarding handling of the item under inspection. For example, the remote expert may indicate that the item does not contain a threat and may be passed along to its destination. Alternatively, the remote expert may suggest that the operator contact other security officials, such as the police. In another embodiment, where the system and methods described herein may be applied to perform remote diagnostics on equipment or components, the remote expert may discuss with and instruct the operator at the data collection station regarding how to repair faulty equipment or components. It is to be understood that a voice connection between the remote expert and the operator may be established through the system (e.g., using the computing equipment at the stations) or using conventional land or wireless telephone lines that may not be otherwise associated with the screening system.

Referring again to FIG. 3, if the remote expert informs the operator at the data collection station that a threat was detected (step 316), the operator may respond appropriately (step 318) as discussed above. If no threat was detected, the operator may allow the item to continue on to either another inspection station or a loading point, and may continue to scan and screen other items. It is to be appreciated that, in one embodiment, remote analysis of the X-ray data collected about an item under inspection may occur in "real time," i.e., as quickly as possible while the operator awaits instructions regarding the item. The remote screening may thus occur prior to a passenger being allowed to board a flight with the item under inspection. This is most likely the case where the screening is for the purpose of detecting explosives or other dangerous articles. Alternatively, remote screening, for example, for agricultural contraband or drugs, may be implemented according to the methods described while the flight is in progress, and screening results may be transmitted to a destination point of the flight.

Further, a final screening decision could be delayed until a time after an item under inspection leaves one security check-point but before the item passes another check-point. For carry on luggage, the final screening decision may be made immediately prior to allowing a passenger to board an airplane or before a airplane boarded with passengers is allowed to leave the gate.

Such delayed screening may be performed on stored images, which may be stored in server 208 or other suitable data storage system. Once data from multiple items under inspection is in a storage system, the data may be aggregated for more accurate threat detection. For example, data may be aggregated for a specific individual. If a suspicious object is detected in an item of baggage owned by a person, all other items of baggage owned by that person may be scrutinized. Alternatively, data may be aggregated for a specific flight. If a threat or suspicious object is detected in an item of baggage destined for a flight, stored images of all baggage destined for that flight may be retrieved from a storage system and further scrutinized. Alternatively, stored images of all baggage that was checked or passed through a security checkpoint around the same time as a threat item may likewise be scrutinized to reveal accomplices of a person owning an item containing a threat.

Examining aggregated data can also improve the accuracy of threat detection. For example, if one bag contains a suspicious object that could be an explosive is aggregated with another bag with a suspicious object that could be a detonator, the system can report a threat, with a lower probability of reporting a false alarm. Likewise, if multiple bags that have been aggregated contain objects that are suspicious because they could be either weapons or innocuous items, those items may be deemed a threat. In this way, weapons carried by a group of accomplices may be more accurately detected.

Information used to identify which items under inspection should be aggregated may be obtained in any suitable way. For checked baggage information about flight, owner, time of check-in and other parameters may be gathered as part of the check-in process. Such information may be associated with an item of luggage by storing it in a database in connection with a number on a baggage tag that is scanned when an image of the item is acquired at a data collection station. But, any suitable method of associating data with an image of an item may be used.

For items of carry on baggage, similar approaches may be used to associate information with an item of baggage. For example, a security checkpoint containing a data collection station may include a bar code reader, an RF ID reader, or other similar input device that may receive data from a person carrying the item of baggage. Such an input device may read a passenger ID code on a ticket or boarding pass, a smart card issued as an identification card to a trusted traveler, or other identification device associated with a passenger or piece of luggage.

As discussed above, the data collection station 200 may be any of a level one, level two or level three inspection station in a multilevel screening system. In one example, the data collection station may be a level one inspection station, and the remote expert station may be considered to be a level two inspection station. In this example, an operator at the data collection station may transmit to the remote expert station X-ray data corresponding to only suspect items. In another example, where the data collection station may already be a level two or level three inspection station, X-ray data corresponding to all items under inspection may be transmitted to the remote expert for analysis, even if an operator at the data collection station does not detect a potential threat in an item under inspection. It is to be appreciated that the collected X-ray data may or may not be analyzed at the data collection station prior to transmission of the data to the remote expert station.

Figure 5:
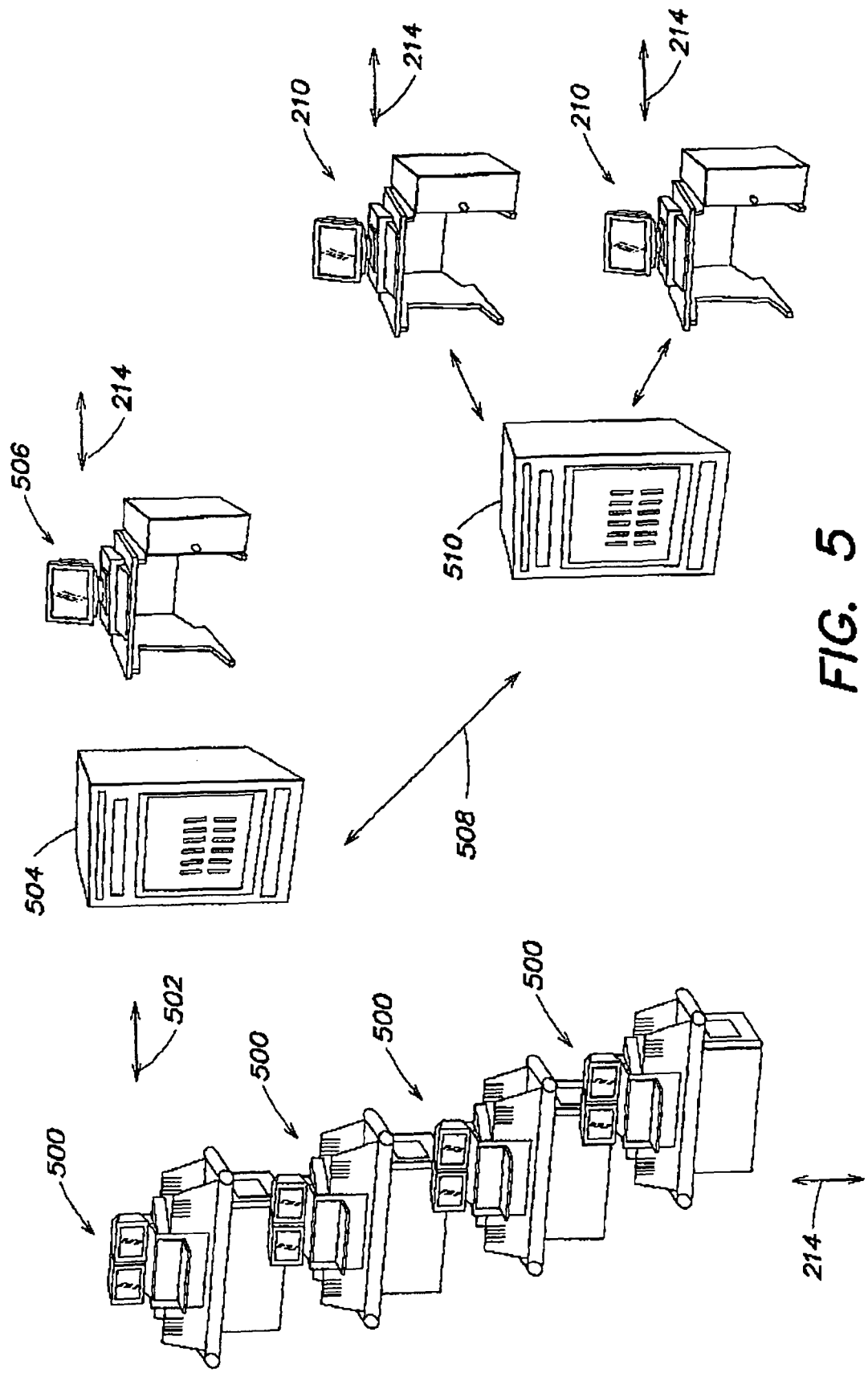
FIG. 5 is a schematic block diagram of another example of a screening system, according to aspects of the invention.

Referring to FIG. 5, there is illustrated another embodiment of a screening system implementing remote data access, according to aspects of the invention. In this embodiment, multiple data collection stations 500, each with X-ray scanning capabilities, may be located at different data collection locations. Each data collection station 500 may X-ray scan an object (item under inspection) and may have automated, first-level screening capabilities. Similarly, each may have a human operator who performs second level screening through viewing and/or manipulating a reconstructed image of scanned items on an operator interface. X-ray data of suspect items, possibly in combination with identification data relating to associated passengers, or other information useful for aggregating data collected on items under inspection may be transmitted over a local network 502 to a local server 504 and local workstation 506, where Level 3 screening may be performed. Again, the screening may include automated detection software and/or a human expert who views and manipulates a reconstructed image of the object on the workstation operator interface, as discussed above.

Still further, a fourth level of even more expert screening, located remotely from the data collection stations 500 and local server 504, may be performed by transmitting X-ray data, and/or possibly additional passenger information, over a communications channel 508 to a remote server 510, as discussed above in reference to FIG. 2. Remote expert stations 210 may gain access to the transmitted information, via the remote server 510, and remote experts may analyze the X-ray data, as discussed in reference to FIG. 2.

In the system of FIG. 5, each level of screening may eliminate certain inspected items as "cleared," i.e., containing no potential threats, and send only suspect items on for further screening, such that fewer and fewer items are analyzed by each higher level of screening. Any number of levels of screening, whether remote or local, can be supported by such a system, according to the present invention. The number of levels, and arrangement and locations of local and remote screening stations, may be arranged to suit a particular application or organization of an airport or airline, or the like.

In some embodiments, it is not necessary that the first level of screening occur locally to the data collection stations. For example, first level screening may be performed at a remote station. A higher level of screening may then be performed at another location, either by electronically moving image data to the higher level inspection station or moving the item under inspection to a second data collection station where further information on the item under inspection may be gathered. At the second inspection station, information may be gathered by collecting further images of the object, collecting information with different types of probes or manually inspecting the item.

Figure 6A:
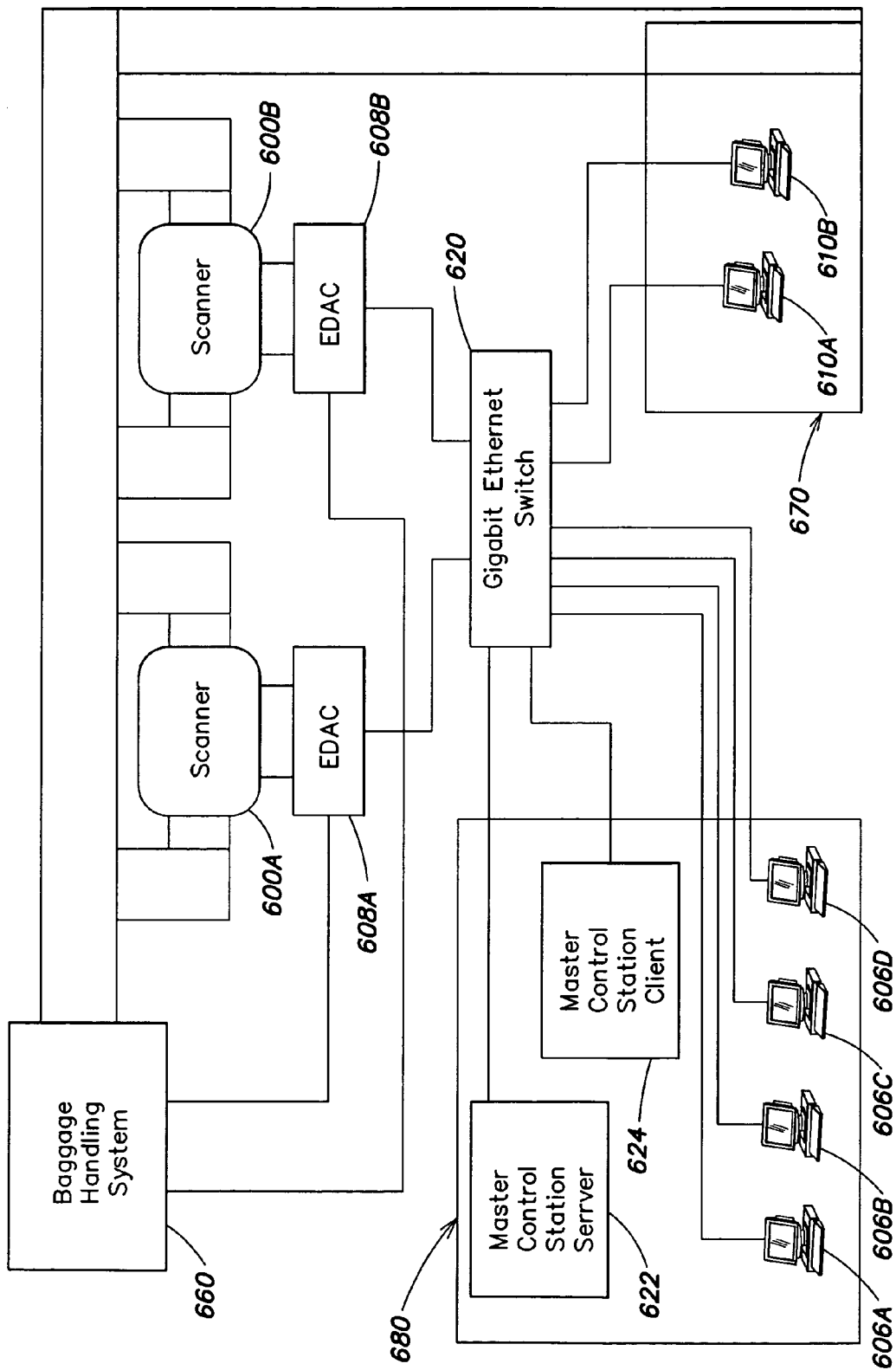
FIG. 6A is a block diagram of a networked explosive detection system according to the embodiment of the invention.

FIG. 6A shows an alternative embodiment of a networked security system. The system includes multiple scanners that serve as data collection stations. Here, scanners 600A and 600B are illustrated. Two scanners are shown for simplicity, but a networked security system may contain many more than two scanners.

Each of the scanners 600A and 600B has an input connected to a baggage handling system 660. Baggage handling system 660 delivers items under inspection to the input of a scanner and can route items from the output to an appropriate location based on the result of screening performed by the networked security system.

Any suitable technology may be used to construct scanners such as 600A and 600B. It is not necessary that each of the scanners be implemented with the same technology. Scanners 600A and 600B, for example, may be dual energy CT scanners, but any suitable form of scanner may be used. In this embodiment, scanners 600A and 600B each collect data representing an image of an item under inspection.

In the embodiment illustrated, each of the scanners has associated with it an explosive detection algorithm computer (EDAC). Here, EDAC 608A is shown connected to scanner 600A. EDAC 608B is shown connected to scanner 600B. In the illustrated embodiment, a one-to-one relationship between a scanner and an EDAC is illustrated, but any suitable number of scanners and EDACs may be incorporated into a networked security system. Having a one-to-one relationship between scanners and EDACs allows the EDAC to be installed in a chassis of a scanner or otherwise physically integrated with the scanner. However, in the illustrated embodiment, the scanner and EDAC are separate units, allowing the EDAC to be implemented with a commercially-available computer, such as an HP-DL 580 server. Information obtained from each scanner 600A, 600B is passed to its associated EDAC 608A, 608B, where a first level of analysis is performed. Each EDAC may be programmed with software for detecting explosives or other contraband as is conventionally used in a security system.

In the illustrated embodiment, the first level analysis at the EDAC identifies any suspicious regions within an image of an item, that image is marked as containing suspicious regions when passed from the EDAC to other levels of the networked security system. In the illustrated embodiment, the next level of processing occurs within baggage viewing area 680.

If processing at EDAC 608A or 608B indicates an item under inspection contains a suspicious region, the EDAC may also send commands to baggage handling system 660 to cause baggage handling system 660 to route the suspicious item to a location appropriate for further processing. For example, the item under inspection may be routed to a second level scanner, where further data is collected. Ultimately, an item under inspection containing suspicious objects may be routed to a location for physical search or destruction. Alternatively, the item under inspection may be routed to a holding area so that a scanner may be used to obtain images of other items while the image of an item under inspection containing a suspicious object is being further analyzed.

Conversely, if processing at the EDAC identifies no suspicious regions in the image, the EDAC may send commands to baggage handling system 660 indicating that the specific item under inspection is cleared. Baggage handling system 660 may then route the item as appropriate for cleared items, such as by routing the item to a loading area for baggage to be loaded on an airplane or routing the item to a retrieval area where passengers may retrieve their carry on luggage that has been cleared.

In the illustrated embodiment, baggage handling system 660 contains multiple conveyors and luggage diverters that allow items under inspection to be routed to the desired locations. The overall baggage handling system 660 may operate under computer control such that control signals sent through a digital interface from an EDAC may be used to control the luggage diverters and other components that control the flow of luggage through the baggage handling system 660.

As illustrated in FIG. 6A, each of the EDACs is directly connected to baggage handling system 660. However, any suitable connection between the EDACs and baggage handling system 660 may be formed. For example, baggage handling system 660 may be connected to multiple EDACs through a network of other suitable interconnection architecture.

In FIG. 6A, each of EDAC's 608A and 608B is connected to a gigabyte Ethernet switch 620. Gigabyte Ethernet switch 620 forms a portion of a high speed data network interconnecting each of the EDAC's 608A and 608B with other elements in the networked explosives detection system.

One of the devices connected to the network through gigabyte Ethernet switch 620 is master control station server 622. Master control station server 622 may be implemented with computerized data processing equipment programmed with software to perform the functions described in more detail herein. In addition, multiple baggage viewing station 606A, 606B, 606C and 606D are connected through gigabyte Ethernet switch 620. Each of the baggage viewing stations 606A . . . 606D serves as an interface for an operator that examines images of items under inspection acquired at one of the scanners 600A or 600B.

Master control station server 622 acts as a postmaster of the system. At power-up of the networked security system, each element registers itself with master control station server 622. Thus master control station server 622 is able to receive images acquired at scanners 600A and 600B and appropriately route them to a baggage viewing station 606A . . . 606D. In the illustrated embodiment, master control station server 622 acquires an image after an EDAC, such as 608A or 608B, indicates level one analysis on the image has been completed and that further analysis has been required. In response to such an indication, master control station server 622 may route that image to one of the baggage viewing stations 606A . . . 606D.

In this embodiment, each of the baggage viewing stations 606A . . . 606D is implemented with a user interface as is conventional in a computer system. The user interface may have a high resolution screen suitable for displaying images and other data. Each baggage viewing station may include other input or output devices, such as a keyboard, a mouse or other pointing devices. These input and output devices allow a user to provide inputs to the system after analyzing data routed to the baggage viewing station by master control server 622. Based on inputs entered by a human operator using one of the baggage viewing stations 606A . . . 606D, master control station server 622 may generate command information destined for baggage handling system 660 to appropriately route the item under inspection. In the embodiment illustrated, master control station server communicates over the network with the EDAC 608A or 608B that forwarded the information for analysis. The EDAC then accesses the interface with baggage handling system 660 to cause the item under inspection to be routed as appropriate based on the screening decision communicated by master control station server 622. However, in an embodiment in which baggage handling system 660 is connected to the same network as master control station server 622, master control station server 622 may communicate directly with baggage handling system 660 over that network.

One possible screening result entered by an operator using a baggage viewing station 606A . . . 606D may be to indicate that an item under inspection should be routed to a second inspection area. In the embodiment illustrated in FIG. 6A, a search area 670 is shown. In response to an input command entered at a baggage viewing station 606A . . . 606B, baggage handling 660 may route an item under inspection to search area 670. At search area 670, human searchers may physically search a suspicious item. As pictured, search area 670 includes search work stations 610A and 610B. Search work stations 610A and 610B may contain a display screen capable of displaying an image of the item under inspection. The image displayed may be the same as displayed for an operator at a baggage viewing station 606A . . . 606D. When baggage viewing station 606A . . . 606D are constructed to allow an operator to input information identifying specific areas of an item under inspection to be searched, this indication may appear on the display of the search work station 610A or 610B, thereby guiding a human searcher to a specific area of the item under inspection.

In the embodiment illustrated, master control station server 622 will generate control information to baggage handling system 660 to route a particular item under inspection to a specific search work station within search area 670. Master control station 622 will also route image data on that item under inspection to a search work station located at that search station. In this way, a human searcher receives both the physical item under inspection and information concerning the item under inspection simultaneously, allowing the information to be used to guide a physical search.

Upon completion of the physical search, the searcher may enter search results into the search work station 610A or 610B. The search results entered by the searcher may be communicated to the master control station 622 and further used to direct the flow of the item under inspection. If, as a result of a physical search, the item under inspection is cleared, master control station server 622 may generate further commands to baggage handling system 660, causing the item under inspection to be processed as cleared baggage. The cleared baggage may, for example, be advanced to a baggage loading area for loading onto an aircraft, or in the case of carry on baggage, may be advanced to a baggage retrieval area where a passenger may retrieve the baggage. Alternatively, if searching within search area 670 confirms that an item under inspection contains a threat, master control station server 622 may communicate the threat as appropriate. For example, the threat may be communicated to law enforcement authorities and/or master control station server 622 may generate commands to baggage handling system 660 that routes the item under inspection to a disposal area.

FIG. 6A also shows that baggage viewing area 680 includes a master control station client 624. Master control station client 624 may be implemented with a computer workstation, such as a desktop PC, or other suitable hardware. In the illustrated embodiment, master control station client 624 is programmed with software that provides command, control and status information, concerning the networked security system. For example, master control station client 624 may provide the user interface for a network operator through which the network operator may receive a status information on each of the scanners 600A or 600B. Alternatively, the networked security system may be implemented to record actions taken by humans interacting with the network or other operations within the system. For example, each decision made by a human operator, whether at a baggage viewing station or a search work station may be logged in conjunction with the information displayed for the operator at the time the decision was made. In this way, operation of the security system as well as the performance of individual human operators may be audited. This information may be used to improve the design or performance of the security system or for training of human operators. In addition, the master control station client 624 may serve as a user interface for a network administrator loading new software into network devices such as EDAC 608A, 608B or master control station server 622. Master control station client 624 may also provide a user interface for performing other network administration functions.

Figure 6B:
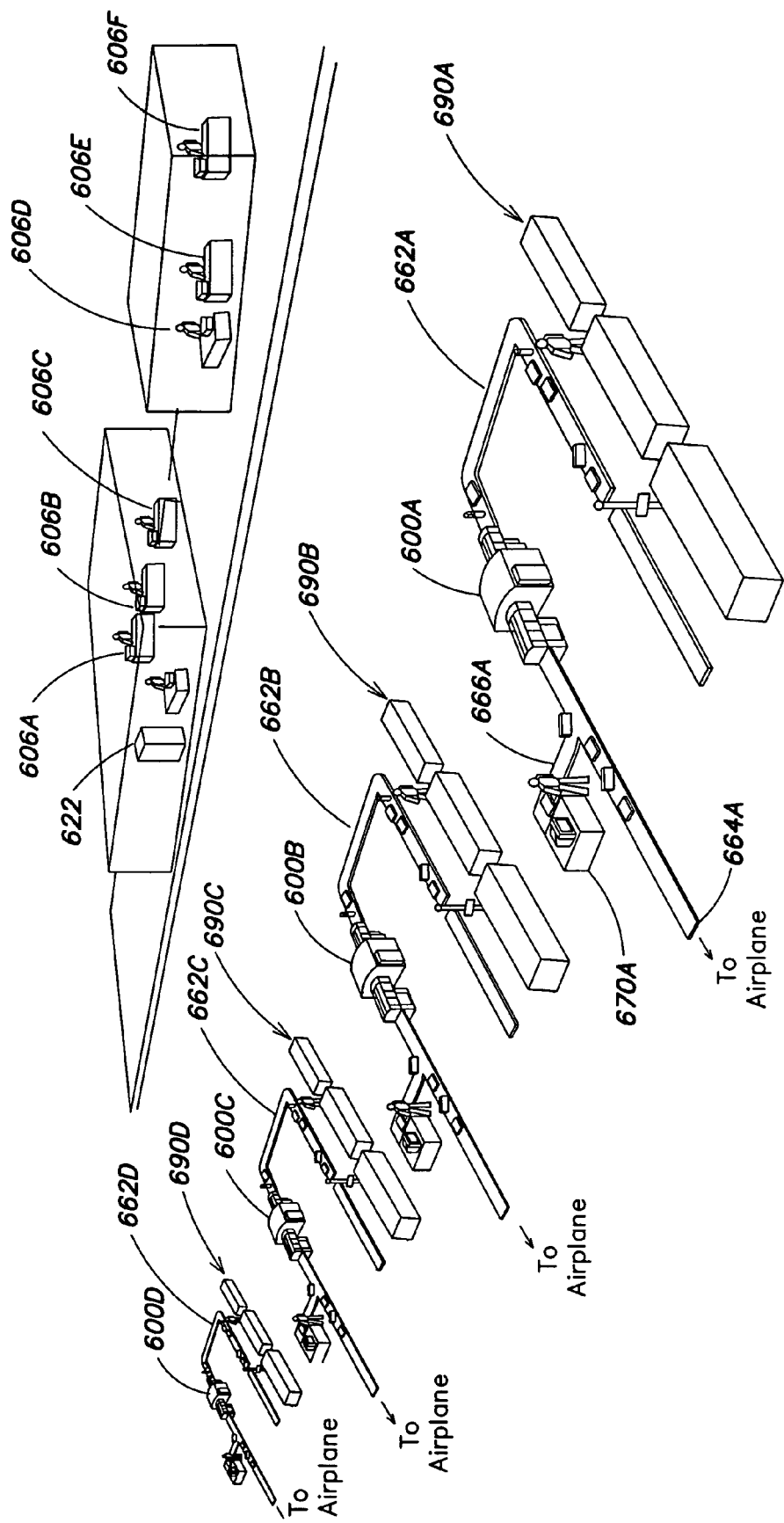
FIG. 6B is a sketch of an implementation of the networked explosives detection system of FIG. 6A.

FIG. 6B shows a sketch of the networked security system of FIG. 6A as it may be implemented in an airport. In this implementation, the networked security system is configured to process checked baggage.

FIG. 6B shows an airport configuration with multiple checking counters 690A, 690B, 690C and 690D. Each of the check-in counters 690A . . . 690D has associated with it a scanner, 600A, 600B, 600C, 600D, respectively. Each of the check in counters 690A . . . 690D is connected to its respective scanner 600A . . . 600D through a belt 662A, 662B, 662C, 662D, respectively, which forms a portion of baggage handling system 660 (FIG. 6A).

As each item of luggage is checked, it is routed to a scanner where an image of the item is acquired. The image is then provided to an EDAC such as EDAC 600A or 600B (FIG. 6A). In the embodiment illustrated in FIG. 6B, each EDAC is integrated into the chassis of its respective scanner. Accordingly, a separate EDAC is not pictured. However, as described above in connection with FIG. 6A, an EDAC associated with a scanner may initially process data acquired by the scanner.

The flow of the item under inspection upon leaving the scanner may be dictated by the results of processing within the EDAC. As shown, baggage handling system 660 includes belts such as 664A, 664B, 664C, 664D that can be used to carry cleared items to a loading area for loading on an airplane.

Alternatively, if processing within the EDAC identifies a suspicious object within the item under inspection, an image of the item may be electronically transmitted to master control server station 622 for further processing. Master control server 622 may route the image of the item under inspection to a baggage viewing station, of which, baggage viewing station 606A . . . 606F are illustrated in FIG. 6D. As shown, baggage viewing stations may be located in the same room with master control station server 622. Baggage viewing station 606A, 606B and 606C are shown located in the same room as master control station server 622. However, such a location is not required. For example, FIG. 6B also shows baggage viewing station 606D, 606E and 606F located in a separate room.

If, as a result of inspection at a baggage viewing station, an item under inspection is cleared, the item may continue on belt 664A, 664B . . . 664D to a loading area. Alternatively, if as a result of inspection at a baggage viewing station an item is deemed to require further inspection, the baggage handling system may divert the item onto a belt 666A, 666B, 666C or 666D, to be routed to a search station 670A, 670B, 670C, 670D, respectively. As pictured in FIG. 6B, a human searcher is positioned at each of the search stations 670A . . . 670D. As pictured in FIG. 6B, the human searcher has access to a search workstation such as 610A or 610B shown in FIG. 6A. As described above, information displayed on such a work station by master control station server 622 may guide the search for threat objects within the item under inspection. If the human searcher determines that the item under inspection contains no threat, the searcher may return the item under inspection to a belt 664A . . . 664D where the item will be conveyed to a loading area. Alternatively, if the search results in finding a threat object within the item under inspection, the human searcher may take appropriate action in response to the threat.

FIG. 6B does not expressly show network connections between the devices in the networked security system. However, any conventional means for interconnecting devices may be used. For example, optical fibers or copper wires may be used. As another example, wireless interconnections such as WI-FI may be used.

Figure 7:
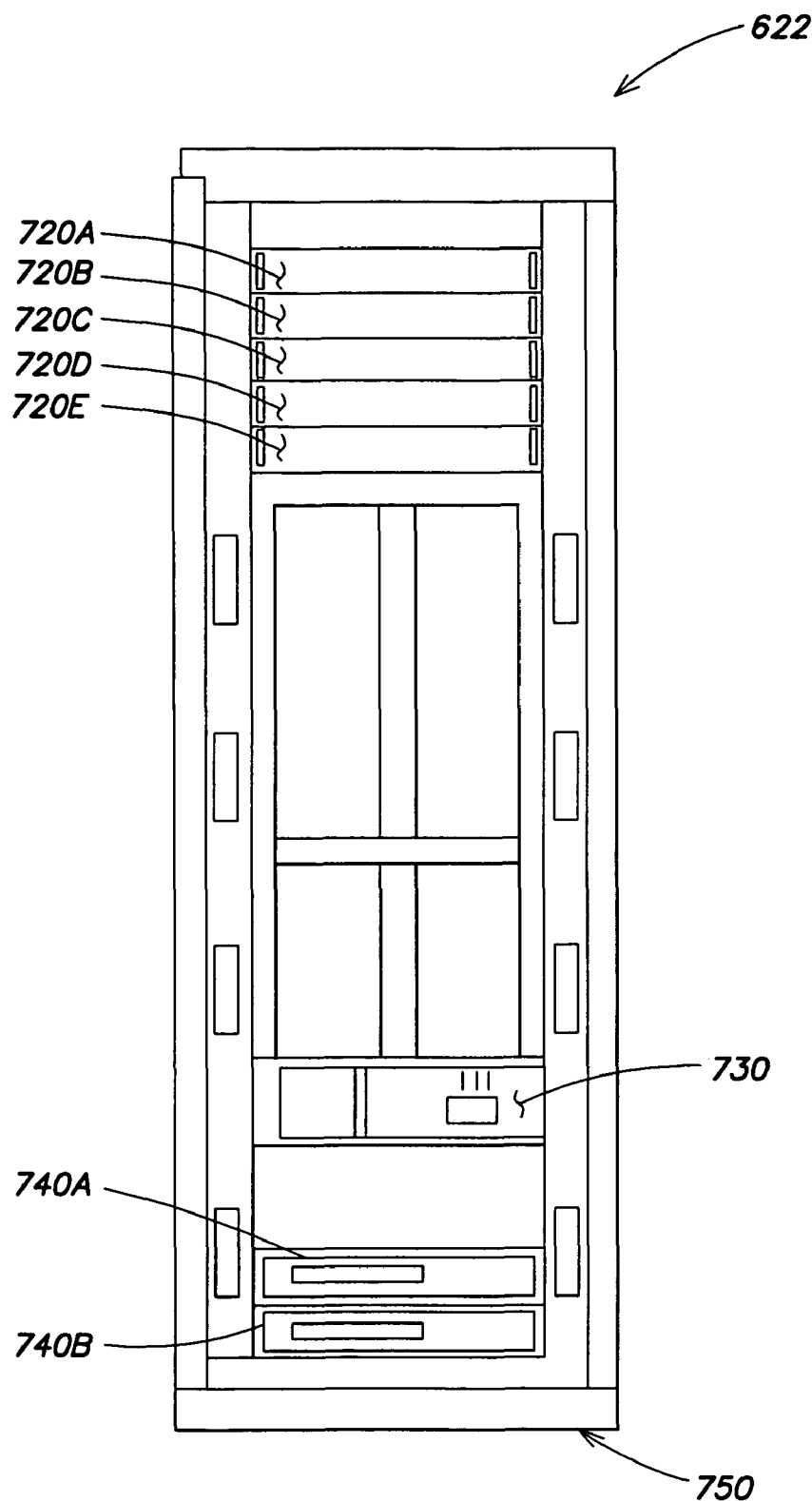
FIG. 7 is a sketch of a server that may be used in the networked explosive detection system of FIG. 6A.

FIG. 7 shows a sketch of master control station server 622 according to one embodiment of the invention. Master control station server 622 is, in this embodiment, assembled in a frame 750. In the embodiment pictured, master control station server 622 is assembled from commercially available components.

As pictured, master control station server 622 includes one or more server units 730. Here the commercially available DL580 server is shown. Each of the server units 730 may include one or more processors.

Power to master control station server 622 is provided by one or more uninterruptible power supplies, also located in frame 750. In the embodiment pictured, uninterruptible power supplies 740A and 740B are shown.

In the embodiment pictured in FIG. 7, the same frame 750 containing server units 730 may also contain units implementing a network switch, such as gigabyte Ethernet switch 620. In the embodiment pictured, the network switch units 720A, 720B, 720C, 720D and 720E are pictured. The network switch units 720A . . . 720E may be commercially available switch units. The specific type of switch units may depend on the selected implementation of the network interconnecting the devices within the networked security system. In the example of FIG. 6A containing a gigabyte Ethernet switch 620, switch unit 720A . . . 720B implement a gigabyte Ethernet switch. However, switch units appropriate for any desired form of network may be used.

It should be appreciated that the number of units shown installed in frame 750 is for illustration only. Any number of units may be installed as appropriate based on the desired configuration of the network to security system. For example, more switch units may be added to integrate more scanners, baggage viewing stations or search work stations into the network. Additionally, more server units 730 may be added to provide greater processing power. Similarly, more power supply units 740A, 740B may be added to meet the power requirements of additional server units or switch units.

In the embodiment illustrated, all of the components of master control station server 622 and gigabyte Ethernet switch 620 fit within frame 750. Frame 750 may be constructed with an enclosure, allowing physical access to master control station server 622 to be restricted by closing the enclosure. However, such an enclosure may be omitted in some embodiments. Further, in some embodiments, the units from which master control station server 622 is assembled may be installed in one or more frames.

Figure 8:
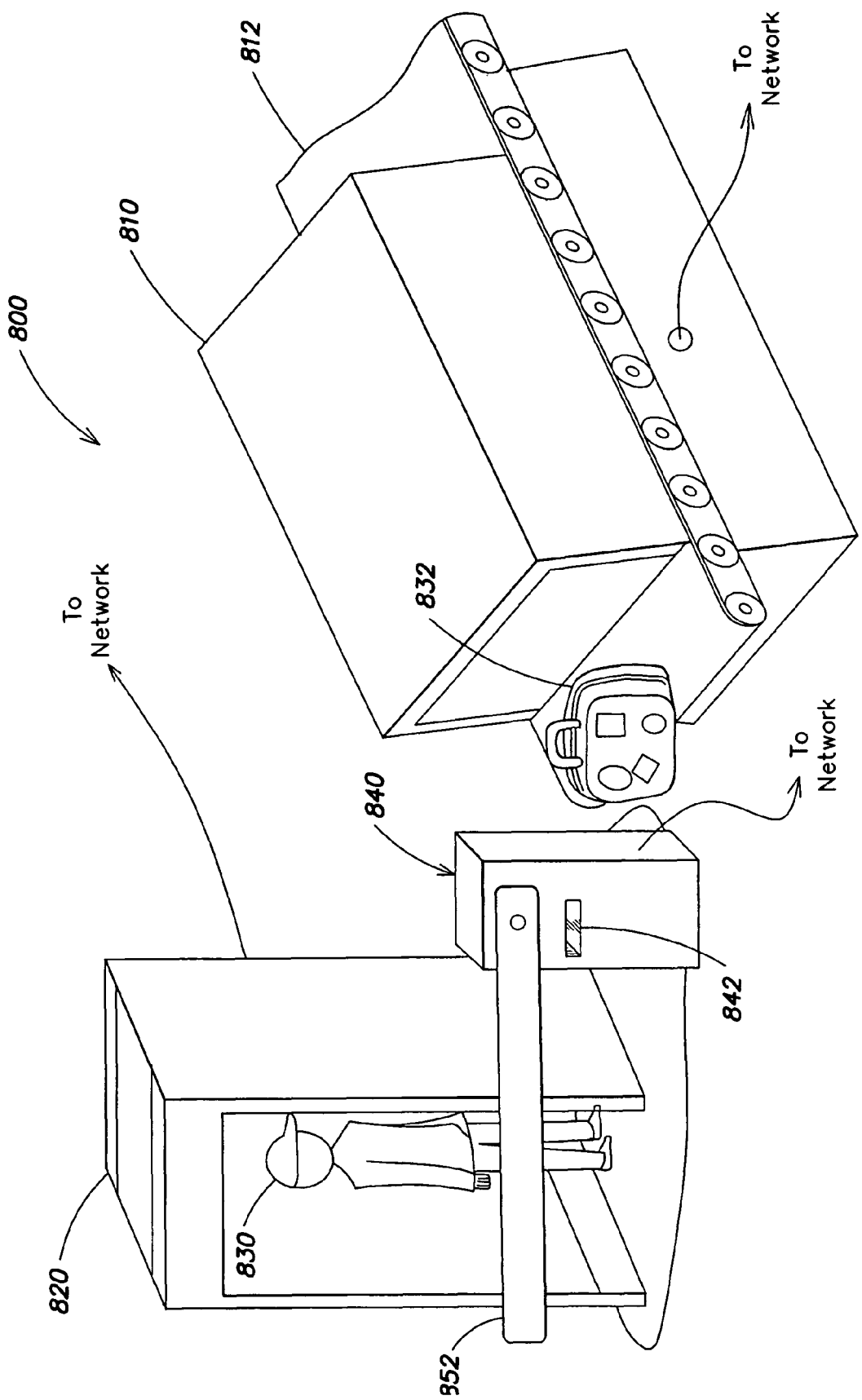
FIG. 8 is a sketch of a security checkpoint according to an embodiment of the invention.

FIG. 8 shows an alternative embodiment of a security system. FIG. 8 shows a checkpoint 800 for security inspections on individuals. Such a checkpoint may be used at an airport to restrict access to a flight boarding area. The checkpoint 800 may be connected to a networked security system as illustrated in FIG. 6A or may be a stand alone checkpoint. If operated as a portion of a networked security system, checkpoint 800 may be used to allow self-service security screening on passengers that have identification indicating that they have been preauthorized to use the self-service security screening. Such preauthorized travelers may be called "trusted travelers."

In the embodiment illustrated in FIG. 8, checkpoint 800 includes a luggage scanner 810, a human scanner 820 and a data input device 840. When checkpoint 800 is a portion of a networked security system, each of these devices may be interfaced to the network interconnecting other devices of that networked security system.

Scanner 810 may be an x-ray scanner as is conventionally used at a security checkpoint. The scanner, for example, may employ multi-energy x-rays to measure properties of materials within items under inspection. Alternatively, or additionally, scanner 810 may be a multi-view x-ray system allowing for a three dimensional representation of objects within the item under inspection to be formed. As shown in FIG. 8, scanner 810 includes a conveyor 812 configured to move items under inspection through scanner 810.

As with the security systems illustrated in FIGS. 6A and 6B, conveyor 812 may be computer controlled to direct an item under inspection to different locations depending on the result of security screening performed using data collected by scanner 810. Though not expressly shown in FIG. 8, conveyor 812 may be operable to direct an item under inspection to either a baggage retrieval area or to a further inspection station based on the results of security screening. Cleared items may be directed to the retrieval area while suspicious items may be directed to a further inspection station. At the further end of inspection station, suspicious items may be manually searched, as in the embodiments illustrated in FIGS. 6A and 6B, or may be subject to further machine inspection, as in the embodiment illustrated in FIG. 1.

Checkpoint 800 also includes a human scanner 820, which may be a metal detector as is conventionally used at a security checkpoint. However, other forms of human scanners may be used, including devices to detect trace explosives or devices to form images using infrared or millimeter wave radiation that may reveal weapons hidden beneath the clothing of a person 830.

Checkpoint 800 is shown configured for use by trusted travelers. Checkpoint 800 includes a data input device 840, which allows a passenger 830 to present identification to authenticate the passenger as a trusted traveler. In the embodiment illustrated, input device 840 includes a reader 842 that may read data from an identification device identifying a passenger. The identification device may be a ticket, a boarding pass, a smart card or other device from which data may be read. Alternatively or additionally, input device 840 may obtain other input information concerning passenger 830 to validate that the person presenting the identification device to reader 842 is in fact the trusted travel. Such additional information may include a photograph of passenger 830 or other biometric data, such as a fingerprint or retina scan.

In the embodiment illustrated in FIG. 8, the data input device 840 is connected to a networked security system such as depicted in FIG. 6A. Accordingly, data input device 840 may be connected through a switch such as switch 620 to a master control station server 622. Master control station server 622 may validate, based on data provided by data input device 840, that passenger 830 is authorized for security screening at checkpoint 800. Accordingly, checkpoint 800 may include one or more physical access control devices, such as movable barrier 852, to control physical access by a passenger 830 to the security checkpoint 800. Movable barrier 852 may respond to command sent over the network by master control server station 622 upon validation that passenger 830 is authorized for screening at checkpoint 800. Physical barrier 852 may be moved to allow passenger 830 to pass through checkpoint 800. Similarly, master control station server 622 may control conveyor 810 to allow items under inspection associated with passenger 830 to move through scanner 810 only when passenger 830 is validated as an authorized user of checkpoint 800.

In the embodiment of FIG. 8 a simple barrier is shown for access control device 852. However, any suitable number and type of access control devices may be used. Such devices may include one or more doors that may be locked or unlocked. Such access control devices may be used in conjunction with alarms, guards or other human observers to ensure that only authenticated passengers pass through checkpoint 800.

As with scanner 810 and data input device 840, human screening device 820 may be connected to a network. The results of screening on a passenger 830 may therefore be passed to master control station server 622 for a determination of whether passenger 830 and an item under inspection 832 belonging to passenger 830 is cleared for passing checkpoint 800.

Figure 9:
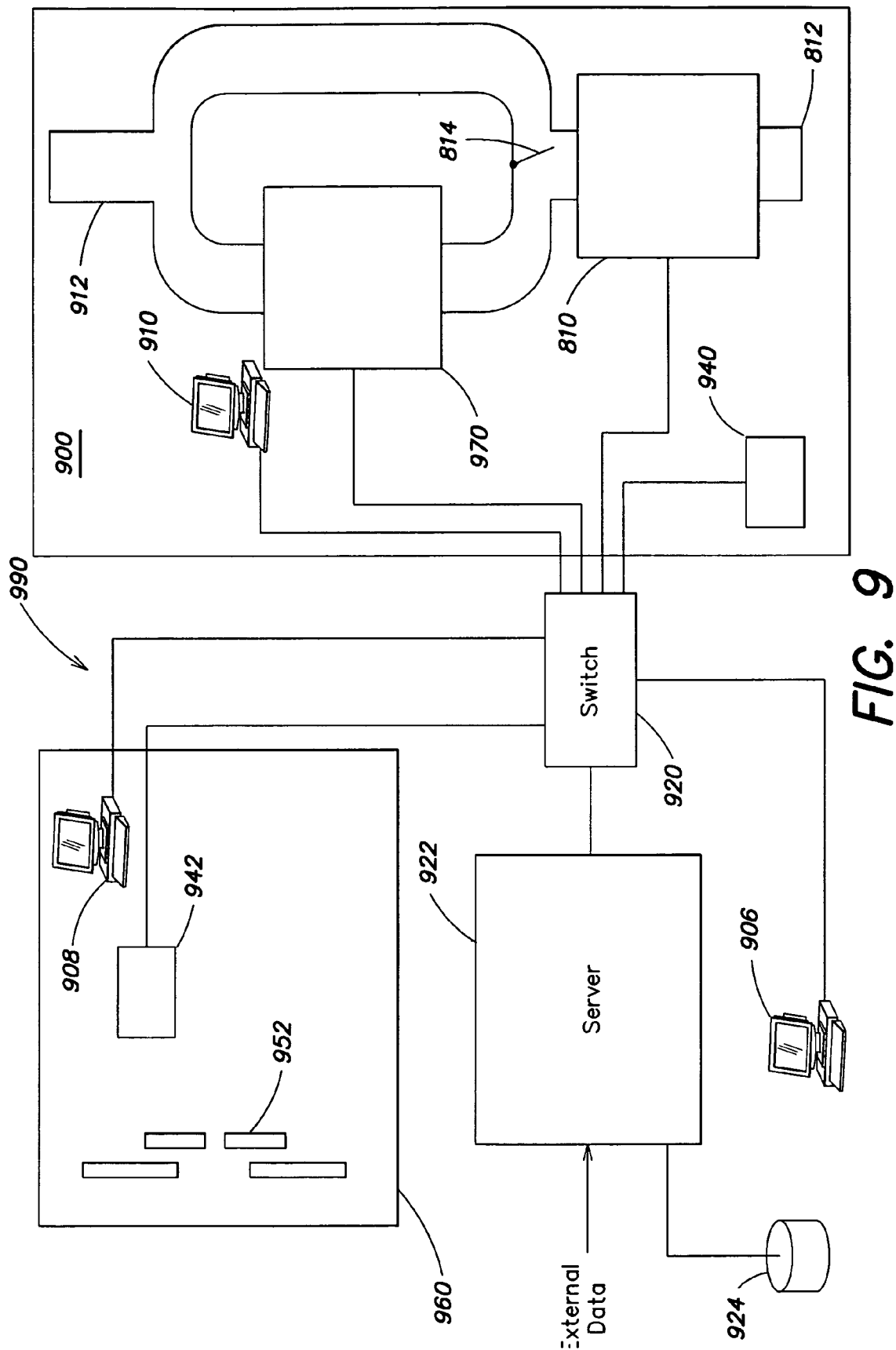
FIG. 9 is a block diagram of a portion of a security system according to the embodiment of the invention.

FIG. 9 shows in block diagram form a networked security system incorporating checkpoint 900.

FIG. 9 shows a networked security system with devices interconnected through the network 990. The network 990 includes switch 920 and links between switch 990 and network devices. The links may be formed with conventional wires, optical fibers or in any other suitable way.

As shown, scanner 810 and input device 940 are connected to a switch 920. Switch 920 is connected to server 922 that may process information obtained at checkpoint 900 and generate a screening result. In the embodiment illustrated in FIG. 9, all baggage that is not cleared as a result of analysis of images acquired by scanner 810 is diverted to a search station 970. Here, conveyor 812 is shown to include a baggage diverter 814 that may direct items under inspection leaving scanner 810 into search station 970 or direct them to bypass search station 970. Items bypassing search station 970 are directed to baggage retrieval area 912. Likewise, items cleared at search station 970 are directed to baggage retrieval area 912. Though not expressly pictured in FIG. 9, baggage diverter 814 may be controlled by control signals generated by server 922 and communicated over network 990.

Search station 970 may be a station for a physical inspection of suspicious items. Alternatively, search station 970 may include one or more probes for measuring properties of items under inspection. For example, inspection station 970 may include a trace explosives detector or other type of probe. As in the embodiments of FIGS. 6A and 6B, search station 970 includes a search work station 910. Search work station 910 is connected through network 990 to server 922. Upon generating a command to route a suspicious item to search station 970, server 922 may also electronically route data on that item to search workstation 910. In this way, a human searcher may obtain information on an item to be searched. Also, search workstation 910 allows the searcher to communicate the results of the search or otherwise send commands or data into network 990.

In the embodiment of FIG. 9, the networked security system includes network devices at a passenger boarding area 960. Passenger boarding area 960 may, for example, represent a departure gate. Doors 952 or other physical barrier may control access to airplane or other secured area. Doors 952 may be operated in response to commands generated by server 922.

In the illustrated embodiment, boarding area 960 includes a data input station 942. Data input station 942 may operate similarly to data input device 840, obtaining information from an identification device carried by a passenger. The identification device may, for example, be a ticket, boarding pass, or smart card. Because the data input device 942 is connected to server 922 through network 990, server 922 may, based on information obtained after a passenger has passed through checkpoint 900, deny access to a specific passenger. Passenger boarding area 960 may include a work station 908 through which a human attendant at passenger boarding area 960 may learn the status of passengers passing through boarding area 960.

Such a configuration is useful in a networked security system in which data acquired by screening passengers and/or luggage may be aggregated and further processed after it is collected. In the embodiment of FIG. 9, server 922 has a database 924. Information obtained by screening passengers or luggage at security checkpoints, such as security checkpoint 900, may be routed over network 990 to server 922 and stored in database 924. Server 922 may receive and store only data relating to suspicious items. Alternatively, data for all items inspected may be stored, at least temporarily, in database 924.

By storing information on items under inspection, the items may be aggregated into groups. Data on items in each group may be analyzed to enhance the ability of the networked security system to detect threats. For example, items under inspection may be aggregated into groups representing all items carried by a single passenger or all items checked by all passengers on a particular flight. Alternatively, items may be aggregated based on a time at which passengers carrying those items passed through a security checkpoint. By analyzing the data in groups, threats may be more readily identified. When a threat is identified from aggregated data, the threat will likely be identified after one or more passengers has passed checkpoint 900. By providing an access control mechanism 952 at passenger boarding area 960, passengers with luggage deemed to represent a threat maybe blocked at passenger boarding area 960.

To facilitate the aggregation of data, checkpoint 900 may include an input device 940. As in the embodiment of FIG. 8, data input device may include a reader to read an identification device associated with a specific passenger. Alternatively, or additionally, data input device 940 may contain a reader to read information associated with a specific piece of luggage. For example, each piece of luggage passing through checkpoint 900 may be given a tag or other identification device that may be read with input device 940. Regardless of whether the data input device 940 obtains data relating to a passenger or an item of luggage, the information collected at data input device 940 may be passed over network 990 to server 922. This information may be stored in conjunction with inspection information acquired by scanner 810.

Server 922 may store the identification information and the inspection information in a data structure within database 924 that allows the inspection information to be selected based on the identification object. This way, server 922 may readily select the images associated with the specific groups it forms. For example, identification information collected at data input device 940 may include the name of the passenger who owns the item under inspection or may include such data as the flight number on which the passenger is booked or the time at which the item was presented for inspection. In this way, server 922 may be programmed to more accurately detect threats.

FIG. 9 also shows that the networked security system includes a work station 906. Work station 906 may be programmed to function as a master control station client 624 as pictured in FIG. 6A or as a baggage viewing station such as 606A . . . 606D in FIG. 6A.

In one embodiment, the occurrence of suspect items transmitted to a next higher level may be tracked via an electronic or automated system that may alert an expert at a next higher level when a certain frequency of suspect items have been noted in a single airport, in geographically related airports, on particular flight patterns, or in any type of pattern that may pose some kind of possible threat. Thus, by aggregating data and correlating objects within items under inspection that have been aggregated, more accurate threat detection may occur.

In another embodiment, experts at different locations may be able to collaborate. For example, two human experts, located at different locations, may be able to view the same reconstructed image of a scanned object where one of the operators, e.g., the remote operator, is manipulating the image. Additional collaborative tools may include text, voice, video, white board drawings, etc. that may be able to be shared through the communications channel, or over separate voice and/or video links as described above, between remotely located operators.

The present invention thus allows for remote, specialized analysis of data collected about an item under inspection, even if sophisticated data analysis, threat detection or image processing algorithms are not available at the data collection site. Furthermore, using a server (see FIGS. 2 and 5), remote experts may be networked, and X-ray data may sent to any currently available expert, regardless of their location. In addition, the system may also be used to transit "training data," i.e., data that may have been artificially generated or stored from previous screenings, that may be used to train operators, experts and algorithms in detecting threat articles.

Having thus described various illustrative embodiments and aspects thereof, modifications, and alterations may be apparent to those of skill in the art.

For example, the system and methods of the invention may be applied to remotely diagnosing faulty equipment, components or the like as well as to baggage screening. In addition, a data collection station may include a scanner other than an X-ray scanner, such as, for example, a CT scanner, and may transfer data other than X-ray data to the remote expert station, for example, CT data.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. For example, processing is described to take place on a "server." The functions of the server may be performed with one or more processors, which may be located in one or more places.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention. Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Such modifications and alterations are intended to be included in this disclosure, which is for the purpose of illustration and not intended to be limiting. The scope of the invention should be determined from proper construction of the appended claims, and their equivalents.

What is claimed is:

1. A networked security system comprising:
  a) a plurality of security check-points, each security check-point comprising:
    i) a data collection station adapted to collect data on each of a plurality of items of luggage; and
    ii) an input device adapted to read identifying information relating to each of the plurality of items of luggage;
  b) a server;
  c) a network interconnecting the plurality of security check-points and the sever, the network being adapted to communicate the data from the data collection station and the input device of each of the plurality of security check-points to the server; and
  d) a computer-readable medium associated with the server, the computer-readable medium having stored thereon:
    i) data on each of the plurality of items of luggage;
    ii) identifying information relating to each of the plurality of items of luggage; and
    iii) computer-executable instructions for:
      A) identifying a group of items of luggage based on the identifying information; and
      B) analyzing the data on each of the items of luggage in the group to detect a threat object in any of the items of luggage in the group based in part on data from another of the items of luggage in the group.

2. The networked security system of claim 1, wherein the server is remote from the plurality of security check-points.

3. The networked security system of claim 1, wherein each of the security check-points is located in an airport and the items under inspection comprise carry-on baggage.

4. The networked security system of claim 3, wherein:
  a) each input device is adapted to read identifying information about a passenger carrying an item of luggage; and
  b) identifying a group comprises identifying items of luggage carried by the same passenger.

5. The networked security system of claim 3, wherein:
  a) each input device is adapted to read identifying information about a flight for which an item of luggage is destined; and
  b) identifying a group comprises identifying items of luggage destined for the same flight.

6. The networked security system of claim 3, wherein:
  a) each input device is adapted to read identifying information about a time at which the item passed through the security check-point; and
  b) identifying a group comprises identifying items of luggage passing through a security check-point during a time interval.

7. A method performed in connection with a networked security system, the networked security system comprising a) a plurality of security check-points, each security check-point comprising a1) a data collection station adapted to collect data on each of a plurality of items of luggage and a2) an input device adapted to read identifying information relating to each of the plurality of items of luggage, b) a server, c) a network interconnecting the plurality of security check-points and the sever, the network being adapted to communicate the data from the data collection station and the input device of each of the plurality of security check-points to the server, and d) a computer-readable medium associated with the server, the computer-readable medium having stored thereon d1) data on each of the plurality of items of luggage and d2) identifying information relating to each of the plurality of items of luggage, the method comprising acts of:
  A) using at least one computer associated with the computer-readable medium, identifying a group of items of luggage based on the identifying information; and
  B) using the at least one computer associated with the computer-readable medium, analyzing the data on each of the items of luggage in the group to detect a threat object in any of the items of luggage in the group based in part on data from another of the items of luggage in the group.

8. The method of claim 7, wherein the act A) comprises: identifying items of luggage carried by the same passenger.

9. The method of claim 7, wherein the act A) comprises: identifying items of luggage destined for the same flight.

10. The method of claim 7, wherein the act A) comprises: identifying items of luggage passing through a security check-point during a time interval.

11. A computer-readable storage device storing one or more programs associated with a server of a networked security system, the networked security system comprising a) a plurality of security check-points, each security check-point comprising a1) a data collection station adapted to collect data on each of a plurality of items of luggage and a2) an input device adapted to read identifying information relating to each of the plurality of items of luggage, b) the server, and c) a network interconnecting the plurality of security check-points and the sever, the network being adapted to communicate the data from the data collection station and the input device of each of the plurality of security check-points to the server, the computer-readable storage device having stored thereon:
  i) data on each of the plurality of items of luggage;
  ii) identifying information relating to each of the plurality of items of luggage; and
  iii) the one or more programs to:
    A) identify a group of items of luggage based on the identifying information; and
    B) analyze the data on each of the items of luggage in the group to detect a threat object in any of the items of luggage in the group based in part on data from another of the items of luggage in the group.

12. The computer-readable storage device of claim 11, wherein the one or more programs comprise instructions for identifying items of luggage carried by the same passenger.

13. The computer-readable storage device of claim 11, wherein the one or more programs comprise instructions for identifying items of luggage destined for the same flight.

14. The computer-readable storage device of claim 11, wherein the one or more programs comprise instructions for identifying items of luggage passing through a security check-point during a time interval.

\* \* \* \* \*